(12) United States Patent
Armacost et al.

(10) Patent No.: US 9,499,109 B2
(45) Date of Patent: Nov. 22, 2016

(54) TRAILER COMMUNICATION SYSTEM

(71) Applicant: Peterson Manufacturing Company, Grandview, MO (US)

(72) Inventors: David Shaw Armacost, Leawood, KS (US); Steven Brent Ham, Lee's Summit, MO (US); Rhett Andrew Peterson, Independence, MO (US)

(73) Assignee: PETERSON MANUFACTURING COMPANY, Grandview, MO (US)

( * ) Notice: Subject to any disclaimer, the term of this patent is extended or adjusted under 35 U.S.C. 154(b) by 0 days.

(21) Appl. No.: 14/606,910

(22) Filed: Jan. 27, 2015

(65) Prior Publication Data

US 2016/0214551 A1    Jul. 28, 2016

(51) Int. Cl.
| | | |
|---|---|---|
| *G08B 21/00* | (2006.01) | |
| *B60R 16/023* | (2006.01) | |
| *H04L 12/40* | (2006.01) | |
| *B60D 1/62* | (2006.01) | |
| *B60D 1/36* | (2006.01) | |
| *B60Q 1/30* | (2006.01) | |

(52) U.S. Cl.
CPC ............. *B60R 16/0231* (2013.01); *B60D 1/36* (2013.01); *B60D 1/62* (2013.01); *B60Q 1/305* (2013.01); *H04L 12/40* (2013.01); *H04L 2012/40273* (2013.01)

(58) Field of Classification Search
CPC .......... B60D 1/36; B60D 1/62; B60Q 1/305; B60R 16/0315; G08G 1/017
USPC .................................. 340/431, 933; 180/167
See application file for complete search history.

(56) References Cited

U.S. PATENT DOCUMENTS

| | | | | |
|---|---|---|---|---|
| 7,015,800 B2* | 3/2006 | Lesesky | ............... | B60R 16/0315 340/431 |
| 7,040,435 B1* | 5/2006 | Lesesky | ................. | G07C 5/008 180/167 |
| 7,434,643 B2* | 10/2008 | Lesesky | ................. | G07C 5/008 180/167 |
| 7,449,993 B2* | 11/2008 | Lesesky | ................. | G07C 5/008 307/10.1 |
| 7,817,019 B2* | 10/2010 | Lesesky | ............... | B60R 16/0315 307/10.1 |
| 8,232,871 B2* | 7/2012 | Lesesky | ............... | B60R 16/0315 340/431 |
| 8,680,976 B2* | 3/2014 | Lesesky | ............... | B60R 16/0315 340/431 |
| 8,957,770 B2* | 2/2015 | Hu | ........................... | B60D 1/62 340/431 |
| 9,014,871 B2* | 4/2015 | Luebke | ................. | G08G 1/017 340/431 |

\* cited by examiner

*Primary Examiner* — John A Tweel, Jr.
(74) *Attorney, Agent, or Firm* — Polsinelli PC (57) ABSTRACT

Implementations of the present disclosure involve an apparatus and/or method for a modular communication system for use in a tractor trailer to monitor and/or control various components associated within the trailer. In one particular embodiment, the communication system includes encryption/decryption controller boards configured to encrypt/encode messages or signals received at the boards for transmission along a transmission media between the front controller board and rear controller board. Further, one or both of the controller boards may be configured to decrypt/decode messages or signals received at the boards from the other controller board and perform a function in response to the decrypted message. The communication system may also integrate and communicate with several modules within or associated with the trailer, such as sensors, locators, or communication mechanisms.

20 Claims, 6 Drawing Sheets

TRAILER COMMUNICATION SYSTEM

FIELD OF THE DISCLOSURE

Aspects of the present invention relate to communication systems and, more particularly, aspects of the present invention involve a modular communication system for use in a tractor trailer to monitor and/or control various components associated within the trailer.

BACKGROUND

Many pull-behind trailers, such as semi-trailers, utilize an electrical connection between the cab pulling the trailer and the trailer itself to power the various components of the trailer. For example, electrical signals created in the cab during stopping of the vehicle are communicated along the electrical connection of the trailer to the stop indicator lights located at the back of the trailer. These electrical signals energize the stop indicator lights such that the lights illuminate. Other components of the trailer, including turn signal lights, running lights, braking systems, and the like are similarly controlled by electrical signals created in the cab and transmitted along the electrical connection to the components in the trailer.

One typical electrical connection between the cab and the trailer includes a Society of Automobile Engineers (SAE) standard J560 connector. The J560 connector is a standardized seven conductor electrical connector that is used to connect the various electronic systems of a pulling vehicle, such as a commercial truck, to the corresponding electronic systems operating on a towed trailer. Typically, the seven conductors are used to power/control a trailer's clearance markers, license plate light, tail lights, left and right turn lights, brake lights, auxiliary/ABS lights, as well as provide a ground return in one example. The J560 connector provides a straight-through connection to operate the components of the trailer, such as those listed. The J560 connector is designed to provide a standard plug into which a cab may connect to one or more components of the trailer for energizing the components. In this manner, the J560 connector is merely a connector for ease in connecting the cab to various trailers that may be pulled by the cab.

It is with these and other issues in mind that various aspects of the present disclosure were developed.

SUMMARY

One implementation of the present disclosure may take the form of a communication system. The communication system includes a first controller board located in a trailer configured to be pulled behind a cab vehicle, the first controller board configured to receive an input from the cab vehicle through a connection socket on the trailer, a second controller board configured to provide an output to control at least one component of the trailer, and a communication media configured to transmit messages between the first controller board and the second controller board. The first controller is further configured to encode the received input and transmit the encoded input along the communication media to the second controller board, the second controller board further configured to decode the encoded input and generate the output based at least on the decoded encoded input, wherein the output is a control signal to control the at least one component of the trailer.

Another implementation of the present disclosure may take the form of a method for controlling aspects of a trailer vehicle. The method may include receiving an input at a first controller board located on the trailer vehicle, the trailer vehicle configured to be pulled behind a cab vehicle and wherein the input is received at the first controller board from the cab vehicle through a connection socket on the trailer, encoding the received input based on a communication protocol, transmitting the encoded input on a communication media to a second controller board located on the trailer vehicle, decoding the encoded input at the second controller board, and transmitting a control signal from the second controller board to at least one component of the trailer vehicle.

DETAILED DESCRIPTION

Implementations of the present disclosure involve an apparatus and/or method for a modular communication system for use in a tractor trailer to monitor and/or control various components associated within the trailer. In one particular embodiment, the communication system includes an encryption/decryption control board on the front end and the rear end of the trailer. The controller boards, in one example, are configured to encrypt/encode messages or signals received at the boards for transmission along a transmission media between the front controller board and rear controller board. Further, one or both of the controller boards may be configured to decrypt/decode messages or signals received at the boards from the other controller board and perform a function in response to the decrypted message. One particular example includes energizing at least one light of the trailer in response to receiving a particular encoded message. In this manner, messages or signals received at one of the trailer may be encoded and transmitted to the other end of the trailer along the transmission path and executed by the receiving controller of the system.

Further, the communication system of the trailer may be configured to integrate and communicate with several modules within or associated with the trailer. For example, the trailer may include several sensors (such as a tire pressure sensor, a cargo temperature sensor, a cargo weight sensor, a current load sensor, and the like) that may provide readings and/or signals to the trailer communication system. These sensor signals may be interpreted, encoded, decoded, or otherwise processed by one or more of the controller boards of the communication system and transmitted in response to the signal. In another example, one or more additional communication systems, such as a cellular communication system or a local area wireless system may connect to or otherwise interact with the trailer communication system. In one particular embodiment, the transmission media between the controller boards of the communication system may include a twisted pair of wires. Further, in one embodiment, the communication system may utilize the standard communication protocol SAE J1939 for a controller area network (CAN) bus system. In this manner, a communication system may be implemented in a trailer that allows for transmission of one or more electrical signals utilized in the operation of a trailer and for the connection and communication of several sensor and/or communication modules of the trailer.

Figure 1:
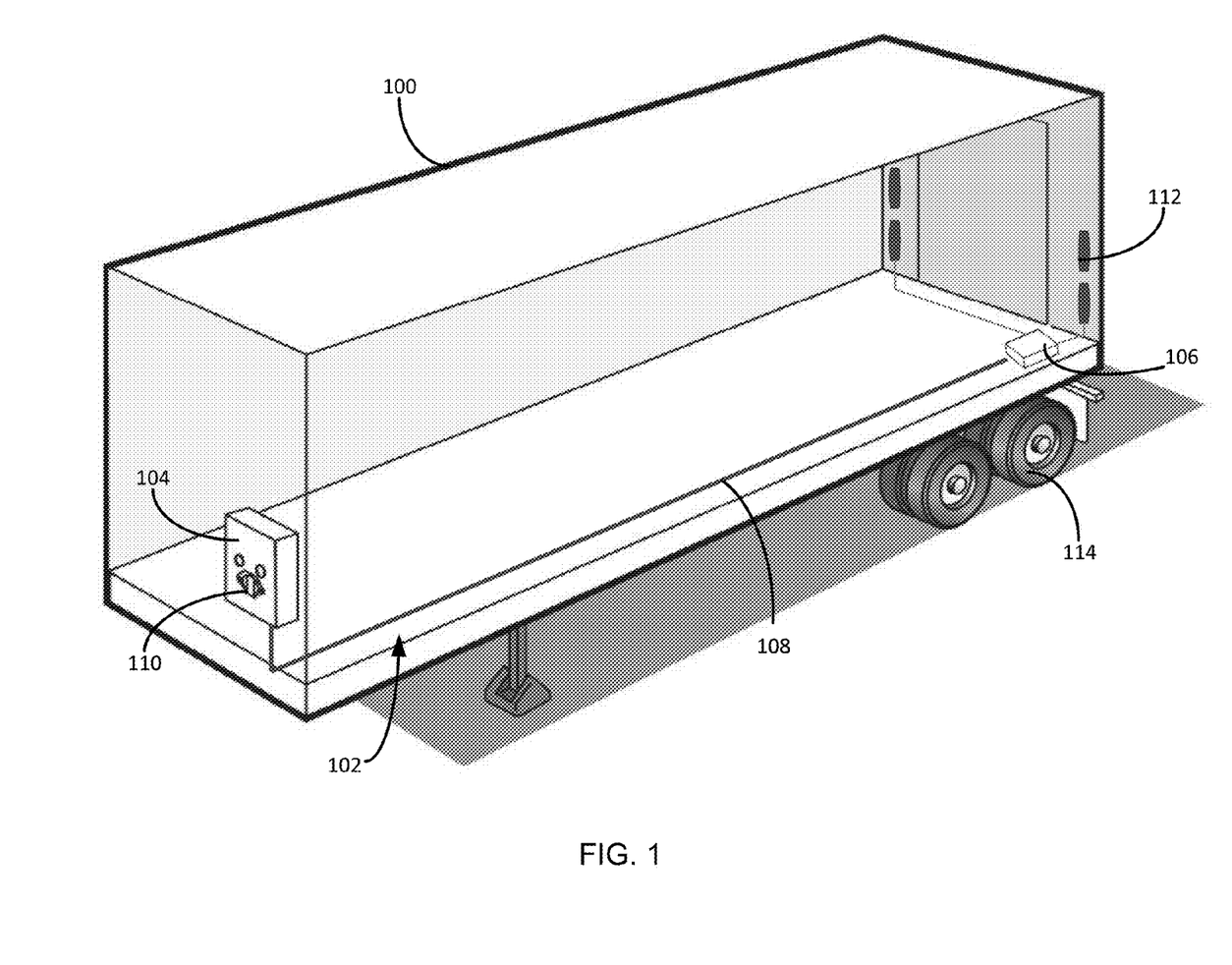
FIG. 1 is a perspective view of a trailer including a modular communication system for controlling or communicating with one or more components of the trailer.

FIG. 1 is a perspective view of a trailer 100 including a modular communication system 102 for controlling or communicating with one or more components of the trailer. The modular communication system 102 of the trailer 100 of FIG. 1 is but one example of the communications systems envisioned. For example, although only two controller boards are illustrated and discussed below, the communication system 102 may include any number of controller boards. Also, although shown as being incorporated into a semi-trailer 100, the communication system 102 may be included in any type of trailer designed to be pulled behind a cab or other type of vehicle. As such, the trailer 100 of FIG. 1 is discussed herein as merely an example trailer for use with the communication system 102.

The trailer 100 of FIG. 1 is a typical semi-trailer configured to be pulled behind a cab vehicle (not shown). Incorporated or otherwise associated with the trailer 100 is a module communication system 102. The modular communication system 102 may include two controller boards 104,106, although some embodiments may include one controller board or several controller boards. In the embodiment shown in FIG. 1, the system 102 includes a front controller board 104 located near the front of the trailer 100 and a rear controller board 106 located near the rear of the trailer. In general, the location of the controller boards 104,106 on the trailer is inconsequential to the overall operation of the communication system. Also, it should be noted that the communication system 102 may include any number of controller boards.

The controller boards 104,106 of the communication system communicate over a transmission media 108. In one embodiment, the transmission media 108 is a twisted pair of wires along which one or more messages between the controller boards may be passed. In another embodiment, the controller boards may communicate wirelessly. In general, any transmission media for the transmission of one or more messages may be utilized with the communication system 102 to transmit messages between the controller boards 104,106 of the system. The operation of the controller boards 104,106 and transmission media is discussed in more detail below with reference to FIGS. 2A and 2B.

In one embodiment, the front controller board 104 may be integrated with or otherwise in communication with a J560 connector socket 110 of the trailer 100. As discussed above, the J560 connector is a standardized seven conductor electrical connector that is used to connect the various electronic systems of a pulling vehicle, such as a commercial truck, to the corresponding electronic systems operating on a towed trailer. The connector may plug into a corresponding socket 110 located on the trailer 100 to electrically connect the seven conductors of the connector to the electrical system of the trailer. In this manner, electrical signals created in the cab may be transmitted to the trailer through the J560 connector and socket 110. As explained in more detail below, these electrical signals may be received at the front controller board 104 of the communication system 102. In other words, the front controller board 104 may be in electrical communication with one or more of the conductors of the J560 connector to receive electrical signals or impulses transmitted along the J560 connector. Further, because the connector is generally standardized throughout the trucking industry, the front controller board 104 may receive the signals from most cabs in the industry through the connector.

In a similar manner, the back controller board 106 (or the front controller board in some embodiments) may be connected to one or more electrical components of the trailer 100. For example, the rear controller board 106 may be in electrical communication with one or more of the lights 112 of the trailer, such as the brake lights. In another example, the rear controller board 106 may be in electrical communication with the brakes of the rear tires 114 of the trailer. In general, any electrical or computing component associated with the trailer may be in communication with the rear controller board 106. As explained in more detail below, the rear controller board 106 may receive one or more messages indicating the operation of a component connected to the rear controller board and may be configured to provide one or more controlling signals to the connected components in response to the received messages. As such, any component that is controllable through an electrical signal on the trailer 100 may be connected to the front controller board 104 and/or rear controller board 106.

Figure 2A:
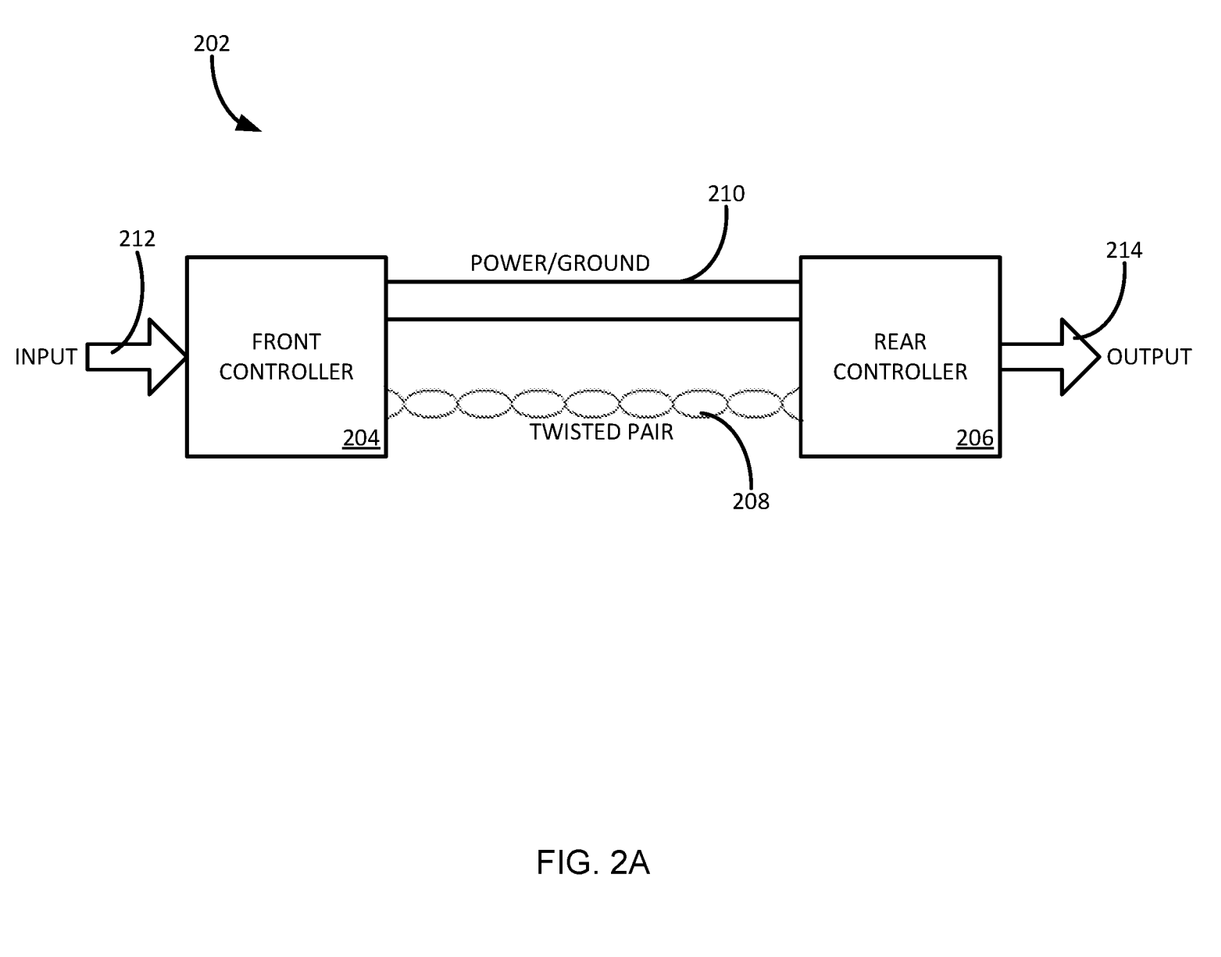
FIG. 2A is a block diagram of the modular communication system of the trailer of FIG. 1.

FIG. 2A is a block diagram of the modular communication system 102 of the trailer 100 illustrated in FIG. 1 and discussed above. As such, many of the components illustrated in FIG. 2A have numerical identifiers as similar components in the communication system of FIG. 1 and discussed above. For example, the front controller 204 of the communication system 202 of FIG. 2A is similar to the front controller 104 of the communication system 102 of FIG. 1. Thus, although the general operation of the communication system 202 is discussed with reference to FIG. 2A, similar operations may be performed by the communication system illustrated in FIG. 1.

As shown and as described above, the communication system 202 may include one or more controller boards. The particular embodiment of the communication system 202 in FIG. 2A includes a front controller board 204 located near the front of a trailer and a rear controller board 206 located near the rear of the trailer. Although discussed through this disclosure as including two controller boards, it should be appreciated that the communication system 202 may include any number of such boards. The controller boards 204,206 communicate with each other through a transmission media, depicted in FIG. 2A as a twisted pair of wires 208. However, the controller boards 204,206 may communicate over any type of transmission media, such as wirelessly. In one embodiment and shown in the communication system 202, a power and/or ground line 210 may be connected between the front controller board 204 and the rear controller board 206. As explained in more detail below, the controller boards 204,206 may control the power provided to one or more components of the trailer from the power/ground line 210. However, in some embodiments, the power/ground line 210 may be provided to each controller board 204,206 separately such that a power/ground line is not necessarily oriented between the controller boards.

Figure 2B:
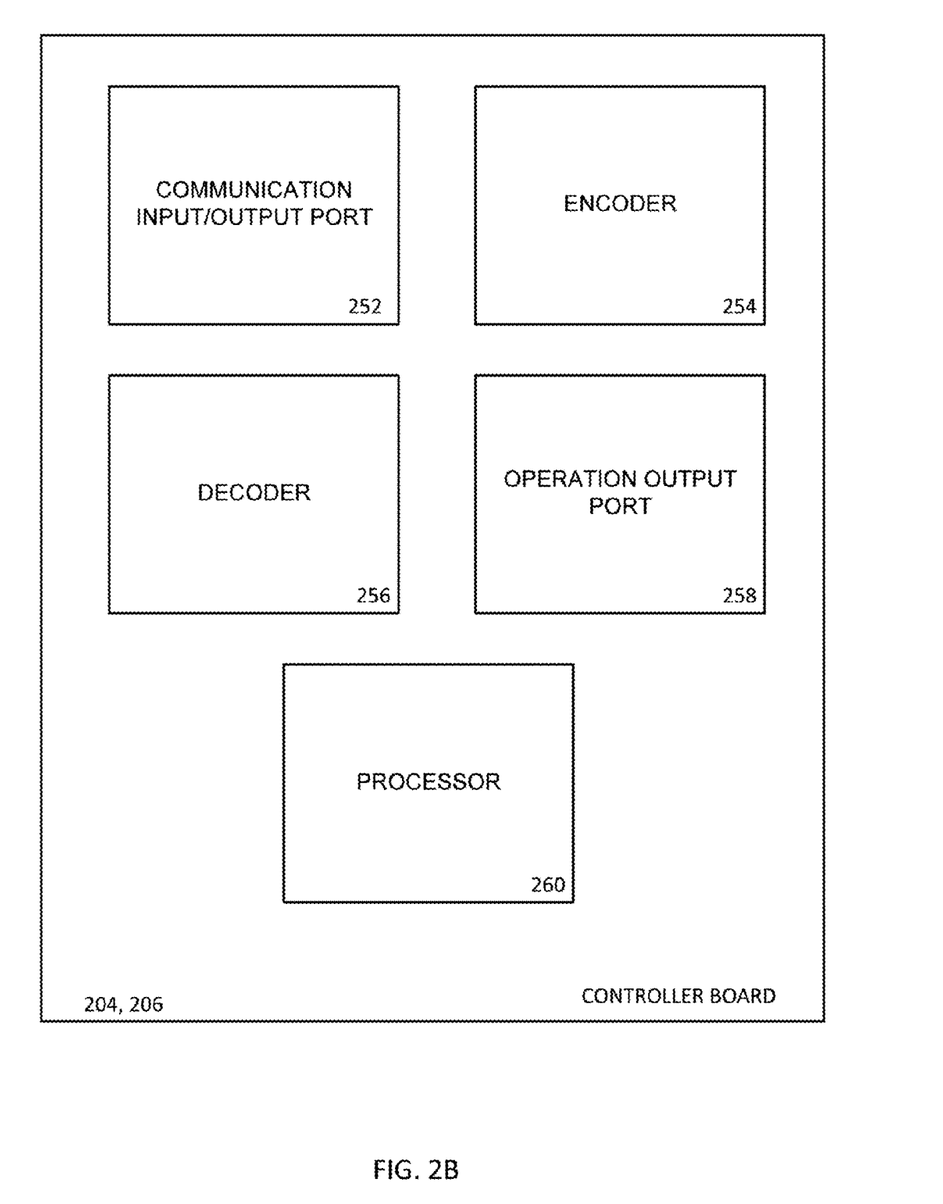
FIG. 2B is a block diagram of a controller board of the communication system of FIG. 2A.

FIG. 2B is a block diagram of a controller board of the communication system of FIG. 2A. In particular, block diagram of the controller board of FIG. 2B may be for the front controller 204 or the rear controller 206 of the communication system, or any such controller connected to the communication system. In the example illustrated in FIG. 2B, the controller boards include (but are not limited to), a communication input/output (I/O) port 252, an encoder module 254, a decoder module 256, one or more operation output ports 258, and a processor 260 or other executing computing components. Additional or fewer components may be included in the controller board 204, 206 that are not shown in FIG. 2B. For example, several components discussed below with reference to FIG. 5 may also be included in the controller board. The operations of each of the components of the controller board 204, 206 may be performed through a series of software instructions, hardware components or a combination of both software and hardware. The general operations of each component of the controller board 204, 206 are described in more detail below with reference to the flowchart of FIG. 3.

In the embodiment shown, the controller board 204, 206 includes a communication I/O port 252. Through the communication I/O port 252, the controller board 204, 206 receives messages transmitted on the communication system and/or transmits such messages. As such, the communication I/O port 252 may be electrically connected to the transmission media 208, such as the twisted pair or wires for communication used by the system. In addition, the controller board 204, 206 may include an encoder module for encoding received messages through the I/O port 252 into a particular communication protocol. Similarly, the controller board 204, 206 may include a decoder module 256 to decode messages received through the I/O port 252 that are encoded. The decoding may occur to execute or otherwise process the received message. The encoding and decoding of messages on the communication system are described in greater detail below.

The controller board 204, 206 may also include an operation output port for transmitting one or more control signals to one or more components of a trailer in response to a received message. Such a control signal may be an electrical signal, message, series of messages, or electrical power supplied on the operation output port 258. To determine when the a control signal is provided on the operation output port 258, the controller board 204, 206 may include a processor 260 configured to process received messages and provide an output signal or control signal, as explained in more detail below. It should be appreciated that additional modules and components may be included in the controller board 204, 206 of the communication system.

Figure 3:
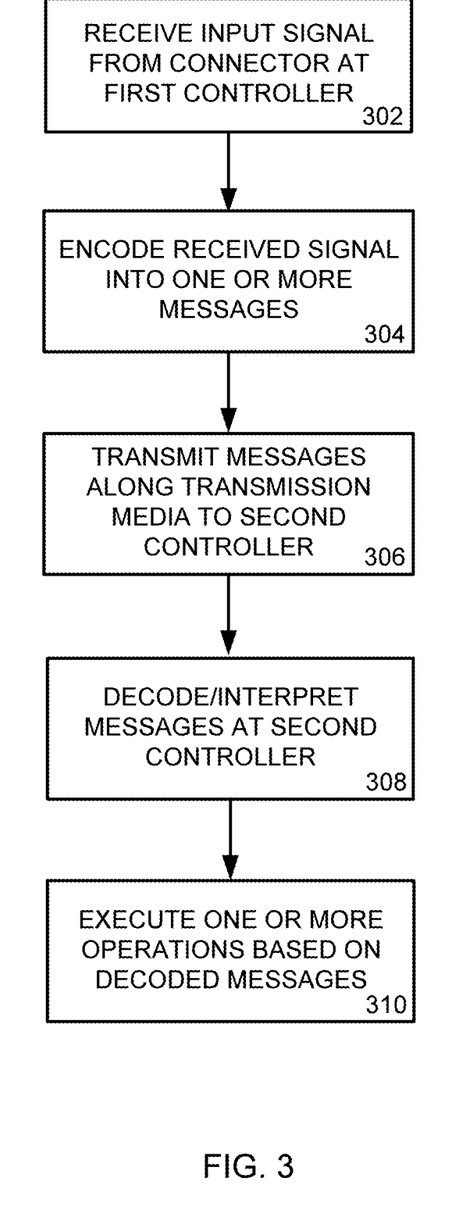
FIG. 3 is a flowchart of an embodiment for communicating along a modular communication system of a trailer.

The operations performed by the trailer communication system 202 are illustrated in the flowchart of FIG. 3. As such, the operations of the method of FIG. 3 are performed by one or more components of the communication system 202 and reference is made to the system of FIG. 2A in the description of the operations below. Further, although the operations are discussed with reference to a communication system 202 with two controller boards 204,206, it should be appreciated that fewer or additional controller boards may be present in the communication system.

Beginning in operation 302, a controller board of the system 202 receives an input signal 212 from a source. In one embodiment, the input signal 212 is received at the front controller board 204 through the conductors of a J560-type connector from a cab vehicle. As such, the front controller board 204 may be in electrical communication with one or more of the conductors of the connector to receive electrical signals 212 from the cab vehicle. In one particular embodiment, the front controller board 204 is located within a socket box mounted on the front of the trailer to receive the signals 212 from the connector. In general, however, the controller board 204 that receives the input 212 may be located anywhere within or near the trailer. For example, the controller board receiving the input 212 may be the rear controller board for signals being sent from the rear of the trailer to the front of the trailer, as described in more detail. Thus, any controller board of the system 202 may receive an input 212 as the controller boards may transmit and/or received messages from other controller boards in the system.

In one example, the received input is an electrical signal on a particular conductor of the connector that indicates braking system of the cab has been applied. In other words, one of the conductors of the connector is associated with the braking system of the cab. The electrical signal is then transmitted to the controller board 204. In addition, the controller board 204 is configured to determine the particular conductor of the connector on which the electrical signal is received and associate the signal with a particular operation that should occur in the trailer. For example, an electrical signal on a particular conductor of the connector may indicate that the cab is braking. The front controller board 204 is associated with the connector in such a manner that the board may determine the received input 212 is associated with the cab braking. As described in more detail below, the communication system 202 may interpret the input 212 and provide for the brake lights on the rear of the trailer to be illuminated. In a similar manner, electrical signals on other conductors of the connector may be received by the front controller board 204 and a subsequent and related operation may be determined by the board. Other such operations include turn signal illumination, running lights illumination, application of brakes to the wheels of the trailer, and so on.

In operation 304, the front controller board 204 encodes a message based at least on the received signal 212 from the connector. For example, the front controller board 204 may determine that the received input 212 indicates that the cab connected to the trailer is braking. In response, the front controller board 204 may create or otherwise encode a message that may be decoded and interpreted as a command to illuminate a brake light. In one particular example, the message may follow the standard communication protocol SAE J1939 for a CAN bus system. However, in general, the message may be encoded in any form or type of communication protocol understandable by the controller boards of the system 202. In another example, the front controller board 204 may simply pass the received electrical signal onto a transmission path without encoding the signal into a message. In the embodiment where the message follows the standard communication protocol SAE J1939 for a CAN bus system, the message may include eight bytes of data and a standard header. The eight bytes of data may include or otherwise indicate information concerning the input 212 to the front controller board 204. In this manner, CAN messages may be assigned or recognized by the controller boards 204,206 of the system 212 as representative of operations to be performed associated with the trailer.

The encoded message may then be transmitted along a transmission path 208 by the first controller board 204 in operation 306. Upon transmission, one or more other controller boards 206 of the system 202 may receive the transmitted message. In some embodiments, each controller board 206 connected to the transmission media 208 on which the message is transmitted receives the message. In such a configuration, the message may include an indicator in either the data bytes or the header that identifies the particular controller board of the system 202 that is to decode the message and perform any associated operations on the trailer. In the example shown in FIG. 2A, the message is transmitted along the twisted pair of wires 208 to the read controller 206.

In operation 308, the rear or receiving controller board 206 decodes the received message. For example, the rear controller board 206 may be configured to receive messages in the CAN bus standard. Such messages may include a data portion and a header portion. Further, in operation 310, the rear controller board 206 may be configured to perform an operation based on the received and decoded message. For example, the received message may indicate to the rear controller board 206 that a braking action is occurring in the cab pulling the trailer. This determination may be made by the rear controller board 206 based in part on logic or a software program executed by the controller board. In particular, the rear controller board 206 may associate certain types of messages or messages with particular data bytes as requesting a particular operation be performed within the trailer. In response, the rear controller board 206 may execute one or more operations through an output signal 214 transmitted by the rear controller.

The operation performed by the rear controller board 206 may vary depending upon the message received. For example, the message received at the rear controller board 206 may indicate the illumination of running lights for the trailer. As mentioned above, this message may be generated by the front controller board 204 upon receiving an input 212 from the cab pulling the trailer and transmitted to the rear controller board 206 along the transmission line 208. Upon receiving the message, the rear controller board 206 may decode the message to determine the controller board should illuminate the running lights of the trailer. In response, the controller board 206 may provide power to the running lights of the trailer as an output 214. In particular, one or more power/ground lines 210 may be connected to the rear controller board 206. Further, the rear controller board 206 may be configured to provide power to any number of output lines connected to components of the trailer. In one particular example, the controller board 206 is configured to provide power to one or more running lights of the trailer. Thus, in response to the received message, the controller board 206 may provide power to the running lights to illuminate the lights. In a similar manner, a second message may be received at the rear controller board 206 indicating removal of power to the running lights which may then be executed by the rear controller board.

Other operations may also be performed by the rear controller board 206 in response to a received message. For example, one or more brake lights may be illuminated by the controller, one or more turn signal lights may be illuminated, one or more braking systems on the wheels of the trailer may be activated, and so on. In general, any component of the trailer may be operated by one or more of the controller boards 204,206 of the communication system 202 in response to a message received from another controller board of the system. Similarly, activation of any component may be ceased by the controller boards 204,206 in response to a received message. In one embodiment, such operation may be executed by electrically connecting a power/ground line 210 to one or more output lines 214 of the controller board 206.

In response to some messages, the controller boards 204,206 may be configured to perform or execute multiple operations. For example, the controller board 206 may output 214 a series of electrical impulses on one or more of the power-ground lines connected to the controller board. As such, a series of operations or steps may be performed by the controller in response to the message. Further, one or more of the controller boards 204,206 may be configured to both encode and/or decode messages transmitted along the communication system 202. Thus, in some instances, the rear controller board 206 may receive an input, encode a message, and transmit the message along the transmission path to the front controller board 204. The front controller board 204 may then decode the received message and perform one or more operations in response. The dual operation of the controller boards 204,206 is discussed in more detail below with reference to FIG. 4.

In addition to providing power/ground as an output 214, the controller boards 204,206 may be configured to output messages or other information as an output. For example and as discussed in more detail below, a sensor may be connected to a controller board of the system 202. In one example, the sensor may include a reset function upon receiving a particular message. This reset message may be generated by a controller board of the communication system 202 in response to receiving a message from another controller board of the system. The controller board may then transmit the reset message to the sensor as an output 214 of the controller board to reset the sensor.

As mentioned above, one embodiment of the communication system includes a single controller board. In such an embodiment, one or more of the operations described above with reference to FIG. 3 may be performed by the single controller board of the communication system. For example, the controller board may receive the input signal, encode the signal, and provide an output to a component of the trailer. Such an embodiment may be utilized when the input signal from the cab vehicle is already in a communication protocol supported by the communication system. For example, the input signal may be provided by the cab vehicle to the controller board in the CAN bus standard protocol. As such, the controller board may then analyze the input signal, decode or otherwise interpret the received input signal, and provide the proper output to one or more components of the trailer. Thus, in this manner, the communication system may include a single controller board that interacts with received signals and provides one or more outputs in response to the received signals to control one or more components of the trailer.

In the manner described above, a communication system 202 may be incorporated into or along with a trailer. The communication system 202 receives one or more inputs (such as from a cab pulling the trailer), encodes the inputs or otherwise generates a message in response to the inputs, transmits the encoded messages to a receiving board of the system, decodes the messages, and executes one or more operations in response to the received message. Further, as described in more detail below, the communication system provides for the connection of various modules to the system for use in exchanging messages between the system and the modules, between the cab and the modules, between the trailer and the modules, or between modules.

Figure 4:
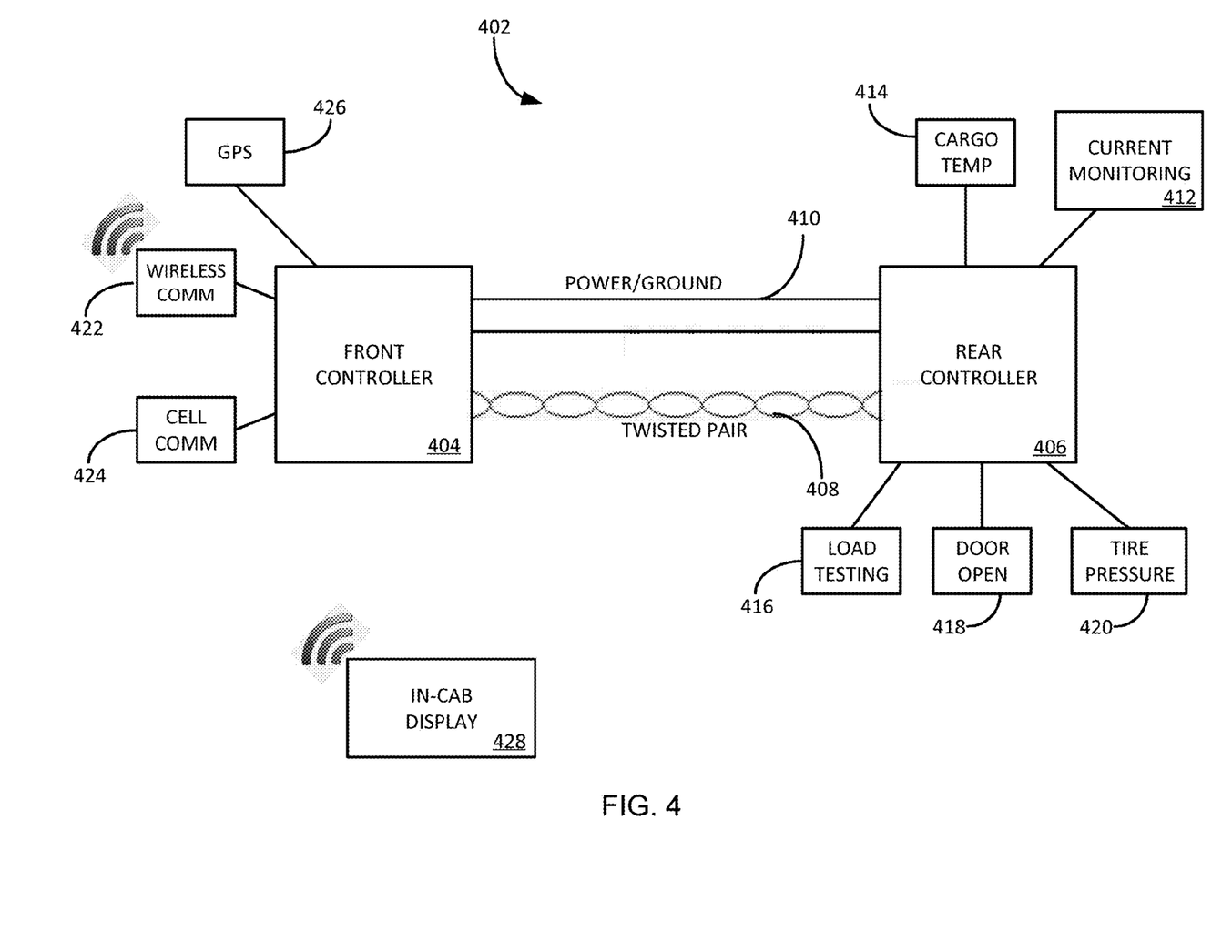
FIG. 4 is a block diagram of the modular communication system of the trailer of FIG. 2A, including a plurality of modular components, sensors, and/or systems connected to the communication system.

In particular, FIG. 4 is a block diagram of the modular communication system of the trailer of FIG. 2A, including a plurality of modular components, sensors, and/or systems connected to the communication system. Similar to above, many of the components illustrated in FIG. 4 have numerical identifiers as similar components in the communication system of FIG. 2A and discussed above. In addition, the communication system 402 of FIG. 4 includes one or more modules connected to the communication system. These modules may utilize the communication system to transmit one or more messages along the communication system 402.

Although shown in FIG. 4 as connected to, communication system 402 at the front controller board 404 and the rear controller board 406, the modules 412-426 may generally be connected to any controller board of the system. Thus, one or more of the modules illustrated may connect to the rear controller board 406 or the front controller board 404. In another embodiment, one or more modules 412-426 may connect to a controller board not shown in the system 402 of FIG. 4. Also, the modules 412-426 illustrated are but some examples of modules that may utilize the communication system 402 of the trailer. In general, any trailer component, sensor, locating device, or communication system known or hereafter developed may be configured to utilize the communication system 402 and connect to the system through one or more controller boards 404,406. The modules discussed herein are for example purposes only.

Also, in many instances, the modules 412-426 may be configured to operate on a similar communication protocol as the communication system 402. Thus, in one example, each module is configured to communicate with the communication system 402 through the CAN bus standard. In other embodiments, the modules 412-426 may be programmable to be configured to operate on the communication protocol of the communication system 402. For example, the communication protocol of the communication system 402 may be proprietary to a particular company and each module may be provided by particular company for use with the communication system 402. In other embodiments, the communication protocol may be shared among several companies such that each module may utilize the communication system 402 although sold separately.

Regardless of the communication protocol utilized in the communication system 402, one or more modules 412-426 may connect to the system for transmitting messages. For example, one or more sensors 412-420 may be connected to or otherwise associated with the communication system 402. Some example sensors are illustrated in the system 402 of FIG. 4, namely: a current monitoring sensor 412 for detecting current flow to one or more components of the trailer; a cargo temperature sensor 414 for measuring the temperature in the trailer; a load testing sensor 416 for measuring the current draw of one or more circuits of the trailer; a door open sensor 418 for detecting when the rear door of the trailer is open; and a tire pressure sensor 420 for detecting when the tire pressure of the trailer drops below a threshold. These sensors 412-420 are but some examples of the types of sensors that may be incorporated into the trailer and in communication with the communication system 402. In general, any type of sensor 412-420 may utilize the communication system 402 to provide modules to the system.

The sensors 412-420, in general, may utilize the communication system 402 to provide measurements from the sensors along the system and/or receive configuration messages. For example, the cargo temperature sensor 414 may measure the temperature within the trailer, such as for cold storage trailers. The measured temperature from the sensor 414 may be transmitted from the sensor to the communication system 402. In one particular example, the measurement is transmitted to the rear controller board 406 and transmitted along the transmission path 408 to the front controller board 404. In one embodiment, the sensor 414 is configured to generate a message of the same communication protocol as the communication system 402. Thus, in one example, the sensor 414 may generate a CAN bus protocol message or messages that includes the temperature reading of the sensor and provide the messages to the back controller board 406. In this example, the back controller board 406 may receive the CAN bus protocol messages and transmit the messages along the transmission path 408 of the communication system 402. In another embodiment, the rear controller board 406 may be configured to receive a measurement or other message from the sensor 414 and convert or otherwise encode the message into the communication protocol of the communication system 402. Regardless of when the message or measurements from the sensor 414 is encoded into the communication protocol of the communication system 402, the sensor may utilize the communication system to transmit the reading or measurement to other components of the trailer.

In a similar manner, other sensors 412-420 associated with the trailer may utilize the communication system 402 to transmit measurements and/or other information through the trailer. For example, the door open sensor 418 may not provide a continuous stream of measurements, but rather only provides a signal when the door of the trailer is open. Upon the condition of an open door, an electronic signal may be transmitted from the sensor 418 to the communication system 402. Also similar to above, the electronic signal of the sensor 418 may be in a protocol utilized by the communication system 402, or may be converted into a protocol by the system. The current monitoring sensor 412 may provide a similar electronic signal when a low current condition is detected on one or more power lines of the trailer. For example, one of the rear lights of the trailer may be malfunctioning such that when power is applied to the light, a low current situation occurs. In this instance, the current monitoring sensor 412 may provide a message or other electronic signal to the system 402 for transmission along the system. A similar approach may be utilized for the tire pressure sensor 420.

Once provided to the communication system 402, information from the sensors 412-420 may be transmitted along the transmission path 408 to one or more controller boards. In one particular embodiment, the information is transmitted to the front controller board 404. In addition, one or more communication mechanisms 422,424 may be connected to or otherwise associated with the communication system 402. Some example communication mechanisms are illustrated in the system 402 of FIG. 4, namely: a cellular communication mechanism 424 and a wireless communication mechanism 422. These communication mechanisms 422, 424 are but some examples of the types of communication mechanisms that may be incorporated into the trailer and in communication with the communication system 402.

In one embodiment of the communication system 402, the communication mechanisms 422,424 connected to the system may transmit one or more of the messages received at a controller board. For example, information from a sensor 412-420, such as a low tire pressure signal, may be transmitted along the transmission path 408 in a manner described above to the front controller board 404. The front controller board may receive the message and be configured to modify and/or provide the message to the cellular communication mechanism 424 of the trailer. The cellular communication mechanism 424 may be configured to connect to a cellular network and broadcast the received message to one or more recipients. In one embodiment, the recipient may be a truck monitoring company. Thus, in a situation where the tire pressure of the trailer drops below a threshold value, the tire pressure sensor 420 may provide an indication of such to the communication system 402. The communication system may then transmit the indication of low tire pressure to the cellular communication mechanism 424 which may contact the truck monitoring company through a cellular network and provide the low tire pressure indication. Information from any module or sensor connected to the communication system 402 may also be provided to the truck monitoring company in a similar manner. For example, a rise in the temperature of the interior of the trailer may be transmitted from the sensor 414 to the truck monitoring company. Similarly, information about the weight of the cargo carried by the trailer at one time or over a period of time may be provided to the truck monitoring company. In this manner, the trucking monitoring company may utilize the communication system 402 to receive alerts and/or information on the operation of the trailer.

Another module connected to the communication system includes a global positioning system (GPS) module 426. The GPS module 426 may be configured to determine the position of the trailer on the earth and provide that position to the communication system 402. Thus, in one embodiment, the GPS module 426 determines the position of the trailer, encode the position in a CAN bus protocol message or messages, and provides that position to the communication system 402. In another embodiment, the controller board 404 may receive the position and encode the position into a protocol utilized by the communication system. Further, the positioning information from the GPS module 426 may be transmitted through the cellular communication mechanism 424 to a recipient. For example and similar to the transmission of the sensor readings and alerts, the location of the trailer may be provided to the truck monitoring company such that the recipient may track the whereabouts of the trailer at any time or over a period of time. Such information may be utilized, in one example, to provide a location of the trailer during a malfunction of the cab so that repairs to the cab may occur.

Another communication mechanism that may be utilized in conjunction with the communication system 402 is a wireless communication mechanism 422. Such a communication system 422 may be used for nearby or local wireless communication. In one particular example, the wireless communication mechanism 422 may be in communication with an in-cab display device 428. In one embodiment, the in-cab display device 428 is a display located within the cab pulling the trailer. The in-cab display 428 may provide a driver with information pertaining to the trailer. For example, the in-cab display 428 may provide an alert signal to the driver when a sensor alarm is triggered, such as a low tire pressure or the opening of the rear door. In one example, the in-cab display 428 may be a cellular phone associated with the driver. In another example, the in-cab display 428 may be a display device mounted in the cab. Regardless of the display device 428, the communication system 402 may be utilized to provide operational information concerning the trailer to the driver in a similar manner to that information being provided to a truck monitoring company. As should be appreciated, information provided to the driver and/or the truck monitoring company through the communication system 402 may increase the safe and reliable operability of the trailer while being pulled.

In one embodiment, one or more of the controller boards 404,406 of the communication system 402 may include a storage device configured to store information received at the system. For example, the controller board may be configured to store in the storage device all or certain types of messages received at the controller board. Thus, rather than, or in addition to, providing sensor alarms and/or GPS positioning to the in-cab display 428 or to a cellular recipient, the information may be stored in the storage device and accessed at a later time for analysis. In another embodiment, a communication line may be provided between the trailer and the cab such that information from the sensors 412-420 and/or the GPS module 426 may be provided to the cab directly.

Figure 5:
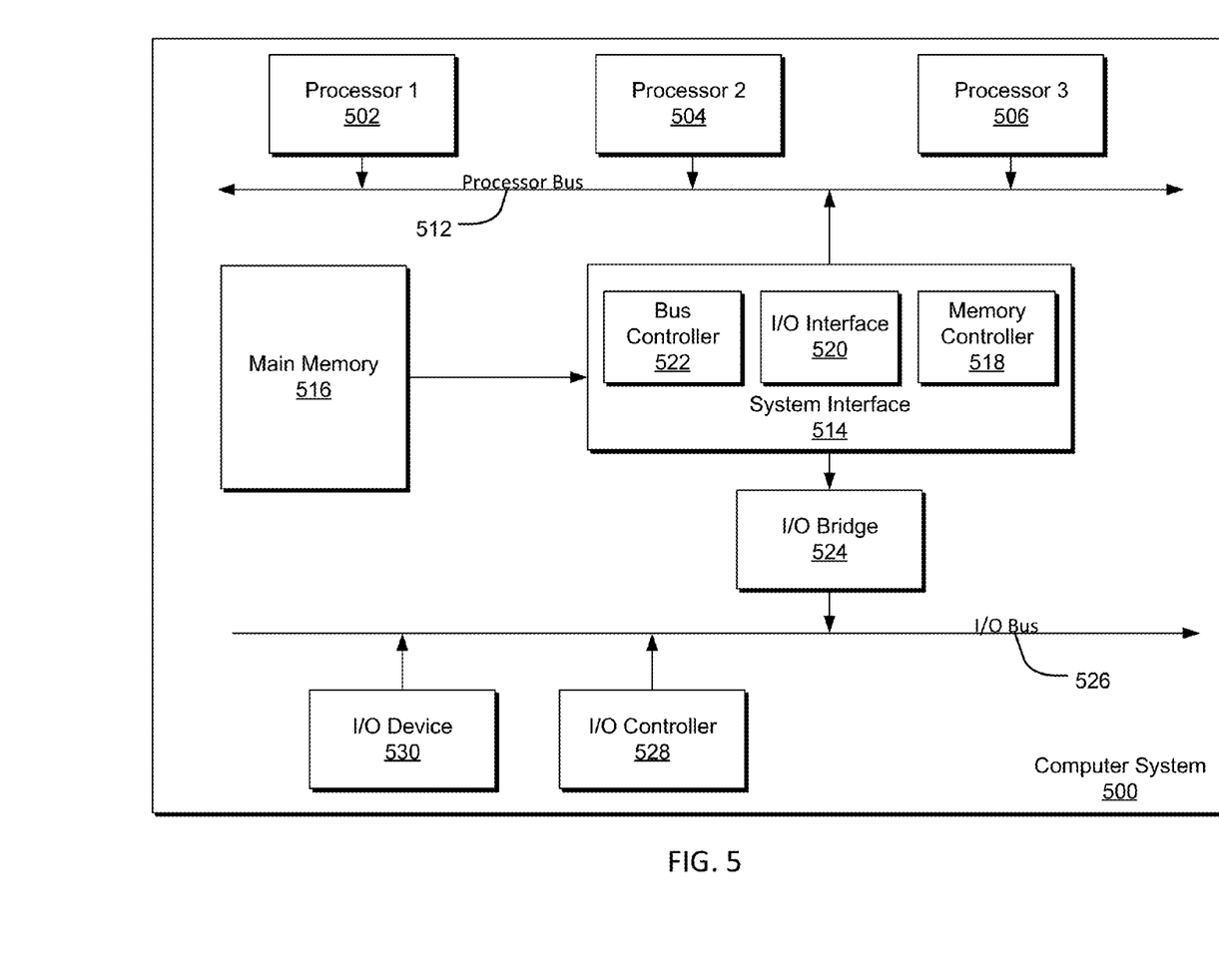
FIG. 5 is a block diagram illustrating an example of a computing system which may be used in implementing embodiments of the present disclosure.

FIG. 5 is a block diagram illustrating an example of a computing device or computer system 500 which may be used in implementing the embodiments of the controller boards of the communication system disclosed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 518 for interfacing a main memory 516 with the processor bus 512. Although not typical of the controller boards of the communication system, the system interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions to perform one or more of the operations of the communication system. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIG. 3 is illustrative only. Alternative embodiments of the present invention may add operations, omit operations, or change the order of operations without affecting the spirit and scope of the present invention. The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A communication system comprising:
a first controller board located in a trailer configured to be pulled behind a cab vehicle, the first controller board configured to receive an input from the cab vehicle through a connection socket on the trailer comprising an energized conductor connected to the connection socket and convert the received input into an encoded message;
a second controller board configured to receive the encoded message and provide an output to control at least one component of the trailer based at least on the received encoded message; and
a communication media configured to transmit messages between the first controller board and the second controller board;
wherein the first controller board is further configured to transmit the encoded message along the communication media to the second controller board, the second controller board further configured to decode the encoded message and generate the output, wherein the output is a control signal to control the at least one component of the trailer.

2. The communication system of claim 1 wherein the at least one component is an illuminating component of the trailer and the control signal is configured to illuminate the illuminating component.

3. The communication system of claim 1 wherein the at least one component is a braking component of the trailer and the control signal is configured to activate the braking component.

4. The communication system of claim 1 wherein the encoded received input is a controller area network (CAN) bus system type message.

5. The communication system of claim 1 further comprising a global positioning system (GPS) receiver configured to provide one or more positional inputs to the communication system.

6. The communication system of claim 1 further comprising at least one sensor configured to provide one or more sensor measurement inputs to the communication system.

7. The communication system of claim 6 wherein the at least one sensor is at least one of a cargo temperature sensor, a current monitoring sensor, a tire pressure sensor, a door open sensor.

8. The communication system of claim 1 further comprising a wireless transmitter, the wireless transmitter configured to wirelessly transmit one or more messages transmitted on the communication media of the communication system.

9. The communication system of claim 8 wherein the at least one wireless transmitter is at least one of a cellular communicator or a local area wireless communicator.

10. The communication system of claim 8 further comprising an in-cab display device configured to receive at least one of the wirelessly transmitted one or more messages and display a message based at least on the received wirelessly transmitted one or more messages.

11. A method for controlling aspects of a trailer vehicle, the method comprising:
receiving an input at a first controller board located on the trailer vehicle, the trailer figured to be pulled behind a cab vehicle and wherein the input is received at the first controller board from the cab vehicle through a connection socket on the trailer, the input comprising an energized conductor connected to the connection socket;
encoding the received input based on a communication protocol into an encoded message;
transmitting the encoded message on a communication media to a second controller board located on the trailer vehicle;
decoding the encoded message at the second controller board; and
transmitting a control signal from the second controller board to at least one component of the trailer vehicle based at least on the decoded message at the second controller board.

12. The method of claim 11 wherein the at least one component is an illuminating component of the trailer and the control signal is configured to illuminate the illuminating component.

13. The method of claim 11 wherein the at least one component is a braking component of the trailer and the control signal is configured to activate the braking component.

14. The method of claim 11 wherein encoding the received input comprises converting the received input into a controller area network (CAN) bus system-type message.

15. The method of claim 11 further comprising receiving one or more positional inputs from a global positioning system (GPS) receiver.

16. The method of claim 11 further comprising receiving one or more sensor measurement inputs from at least one sensor.

17. The method of claim 16 wherein the at least one sensor is a least one of a cargo temperature sensor, a current monitoring sensor, a tire pressure sensor, or a door open sensor.

18. The method of claim further transmitting one or more messages transmitted on the communication media to a wireless transmitter, the wireless transmitter configured to wirelessly transmit the one or more transmitted messages.

19. The method of claim 18 wherein the at least one wireless transmitter is at least one of a cellular communicator or a, local area wireless communicator.

20. The method of claim 18 further comprising transmitting the one or more messages to an in-cab display device configured to receive at least one of the wirelessly transmitted one or more messages and display a message based at least on the received wirelessly transmitted one or more messages.

* * * * *